United States Patent Office 3,030,417
Patented Apr. 17, 1962

3,030,417
CATALYTIC PROCESS FOR THE PREPARATION OF ALKYLATED PENTABORANES
George E. Ryschkewitsch, Columbus, Ohio, assignor, by mesne assignments, to Olin Mathieson Chemical Corporation, a corporation of Virginia
No Drawing. Filed Sept. 6, 1955, Ser. No. 532,745
10 Claims. (Cl. 260—606.5)

This invention relates to the manufacture of liquid alkylated pentaboranes and, in particular, to the alkylation of pentaborane with olefins of 2 to 5 carbon atoms in the presence of an alkylation catalyst which is a lower alkyl amine. The preparation and manner of using liquid alkylated pentaboranes is described in Altwicker, Garrett, Weilmuenster and Harris application Serial No. 497,408, filed March 28, 1955.

Pentaborane may be prepared by methods which are described in the art; it is a colorless liquid which melts at −46.8° C. The boron hydrides, and pentaborane in particular, because of their high heats of combustion, have been recognized as materials which are potentially of value as high energy fuels. The burning of these materials with oxygen liberates considerably more energy than the oxidation of a corresponding amount of hydrocarbon, producing very high flame temperatures. Pentaborane suffers from several disadvantages: (1) it has a very disagreeable odor; (2) it has a relatively high vapor pressure; its vapor being 66 mm. of mercury at 0° C. and its boiling point at atmospheric pressure being 58° C.; and (3) its vapors are highly toxic.

One of the objects of this invention is to provide a method for producing high energy liquid products less volatile and less toxic than pentaborane but at the same time approaching pentaborane in heat of combustion. In accordance with the present invention it has been discovered that pentaborane can be reacted with monoolefins containing from 2 to 5 carbon atoms in the presence of an alkylation catalyst which is a lower alkyl amine to form alkylated pentaboranes which are stable, relatively non-volatile liquids with convenient handling characteristics. By this process olefins, which are available at relatively low cost in large tonnages, are reacted with pentaborane in the presence of amine catalysts to form valuable alkylated pentaboranes in yields substantially greater than those obtained when olefins and pentaborane are reacted under the same conditions without the use of these catalysts.

The following examples illustrate various embodiments falling within the scope of my invention and are to be considered as not limitative. In the examples, the term "moles" means gram moles unless otherwise specified.

*Example I*

In this experiment 10.03 millimoles of pentaborane were condensed into a 60 ml. glass bulb which was immersed in a Dewar flask filled with liquid nitrogen (temperature −196° C.). Then 10.40 millimoles of isobutylene followed by 0.10 millimole of trimethyl amine (Matheson C. P. material) were condensed into the bulb at the same temperature. At this temperature the reactants were solids. The bulb was sealed, removed from the flask, and stored at −28° C. for approximately 16 hours in a deep-freeze. At this temperature the reactants were liquids. The bulb was put into a Fischer Isotemp oven and heated for 7½ hours at a temperature of 150° C. After being removed from the furnace, the bulb was allowed to cool to room temperature, and placed in a deep-freeze for one hour. Next, the bulb was attached to a vacuum line, cooled with liquid nitrogen, and opened to the vacuum line. There was no measurable amount of non-condensible gas observed.

A portion of the crude product in the bulb was allowed to warm up and was fractionated through a series of cold traps. In the first instance the material was allowed to pass through three traps, the first being held at −78° C., the second at −116° C. and the third at −196° C. Through a series of additional fractionation operations carried out with the cold traps, the pentaborane was finally isolated in a −78° C. trap and the hydrocarbon in a −196° C. trap. The remaining material in the bulb was fractionated through a series of four cold traps held at −8.5° C., −21° C., −45° C. and −78° C., respectively. In the trap held at −45° C. a fraction was obtained which exhibited a vapor pressure of 5.5 mm. at 27° C. This material was refractionated through three traps held at −8.5° C., −21° C. and −78° C. respectively and in the −78° C. trap a material was collected which had a vapor pressure of 6 mm. of mercury at 28° C. which is identical with the vapor pressure of tertiary butylpentaborane. The weight of this material collected in the −45° C. trap was 0.0971 gram.

The yield of tertiary butylpentaborane was 43 percent based on the pentaborane used in the reaction. The remainder of the pentaborane used was transformed into tritertiary butylborane and other viscous liquids containing carbon which are not volatile at room temperature.

*Example II*

This experiment was carried out in a manner similar to that described for Example I. First, 10.01 millimoles of pentaborane was condensed in a bulb of 60 ml. capacity which was cooled to −196° C. by immersion in liquid nitrogen. Isobutylene in the quantity of 10.34 millimoles was then condensed into the bulb and finally 0.30 millimole of trimethylamine was added to the bulb in the same manner. The bulb was sealed and stored at −28° C. for approximately 16 hours in a deep-freeze. It was then placed in a Fischer Isotemp oven and heated for 7½ hours at a temperature of 150° C. After being removed from the furnace the bulb was allowed to cool to room temperature and then placed in a deep-freeze for approximately one hour. Next, it was attached to a vacuum line, cooled by immersion in liquid nitrogen, and then opened to the vacuum line. As in Example I there was no measurable non-condensible gas observed.

Through a series of fractionations carried out with the aid of cold traps in the manner described in Example I, 0.45 millimole of tertiary-butylpentaborane was recovered in a −78° C. trap. Vapor pressure of this fraction retained in the −78° C. trap was 6 mm. Hg at 27° C. which corresponds closely to the vapor pressure of this product as previously observed. Based on the quantity of pentaborane consumed in this reaction, the yield corresponds to 12.4 percent.

The product obtained in this experiment was combined with the product obtained in Example I and an infrared examination of this bulked material showed that it contained mainly tertiary butylpentaborane.

*Example III*

This experiment was carried out in a manner similar to that described in Examples I and II. In this case 75.4 millimoles of pentaborane was condensed into a 60 ml. bulb which was cooled to −196° C. by immersion in liquid nitrogen. Isobutylene in a quantity of 10.03 millimoles, followed by 0.11 millimole of trimethylamine were then condensed into the bulb. Through a series of fractionations and handlings identical to those described in Examples I and II, 1.495 millimoles of products was recovered in a trap held at −52° C. Vapor pressure of this product was 5 mm. of Hg at 27° C. which was substantially identical to that exhibited by tertiary butylpentaborane which had been prepared by other methods.

Various modifications can be made in the procedures of the specific examples to provide other embodiments which fall within the scope of my invention. Thus, in place of the isobutylene used, there can be substituted other monoolefin hydrocarbons containing from 2 to 5 carbon atoms for example, ethylene, propylene, 1-butene, 2-butene, 1-pentene, 2-pentene, 2-methyl-2-butene and the like. Also, in place of the trimethylamine, there can be substituted other lower alkyl amines, generally containing not more than 5 carbon atoms in each alkyl radical, for example monomethylamine, monoethylamine, mono-n-propylamine, mono-sec-butylamine, dimethylamine, trimethylamine, diethylamine, triethylamine, methylethylamine, methylisopropylamine, di-n-propylamine, tri-n-propylamine, di-n-butylamine and tri-n-butylamine. The relative amounts of the various materials introduced into the reaction zone can be varied widely, as can also the reaction temperature. The ratio of olefin to pentaborane utilized in carrying out the reaction will generally vary from about 0.1 to 10 moles of the olefin per mole of pentaborane, the preferred range being from 0.5 to 1.5 moles of the olefin per mole of pentaborane, depending upon the degree of alkylation desired. The quantity of amine used will generally range from 0.0005 to 0.1 mole per mole of pentaborane, preferably from 0.001 to 0.03 mole per mole of pentaborane. The reaction temperature will usually be within the range from about 130 to 190° C. preferably from 140 to 155° C. Also, the reaction time can be varied quite widely usually from 1 to 24 hours or more, but preferably from 4 to 8 hours.

I claim:

1. A method for the preparation of liquid alkylated pentaboranes which comprises reacting pentaborane with a monoolefin hydrocarbon containing from 2 to 5 carbon atoms while they are in admixture with a catalytic amount of a lower alkyl monoamine.

2. A method according to claim 1 wherein said monoolefin hydrocarbon is ethylene.

3. A method according to claim 1 wherein said monoolefin hydrocarbon is propylene.

4. A method according to claim 1 wherein said monoolefin hydrocarbon is isobutylene.

5. A method according to claim 1 wherein said amine is trimethylamine.

6. A method for the preparation of liquid alkylated pentaboranes which comprises reacting pentaborane and from 0.1 to 10 moles, per mole of pentaborane, of a monoolefin hydrocarbon containing from 2 to 5 carbon atoms at a temperature within the range from 130° to 190° C. while the reactants are in admixture with from 0.0005 to 0.1 mole, per mole of pentaborane, of a lower alkyl monoamine.

7. A method according to claim 6 wherein said monoolefin hydrocarbon is ethylene.

8. A method according to claim 6 wherein said monoolefin hydrocarbon is propylene.

9. A method according to claim 6 wherein said monoolefin hydrocarbon is isobutylene.

10. A method according to claim 6 wherein said amine is trimethylamine.

No references cited.